United States Patent
Nakayama et al.

(10) Patent No.: US 10,608,230 B2
(45) Date of Patent: Mar. 31, 2020

(54) EXTERNAL CONNECTION BUSBAR HOLDING MODULE AND CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Osamu Nakayama, Mie (JP); Tetsuya Fujita, Mie (JP); Katsushi Miyazaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/465,772

(22) PCT Filed: May 22, 2018

(86) PCT No.: PCT/JP2018/019638
§ 371 (c)(1),
(2) Date: May 31, 2019

(87) PCT Pub. No.: WO2018/230277
PCT Pub. Date: Dec. 20, 2018

(65) Prior Publication Data
US 2019/0393471 A1 Dec. 26, 2019

(30) Foreign Application Priority Data
Jun. 12, 2017 (JP) .................................. 2017-115192

(51) Int. Cl.
*H01R 25/16* (2006.01)
*H01M 2/20* (2006.01)
*H01M 2/10* (2006.01)

(52) U.S. Cl.
CPC ......... *H01M 2/206* (2013.01); *H01M 2/1077* (2013.01); *H01R 25/162* (2013.01); *H01M 2220/20* (2013.01)

(58) Field of Classification Search
CPC ............... H01M 2/206; H01M 2/1077; H01M 2220/20; H01R 25/162
See application file for complete search history.

(56) References Cited

U.S. PATENT DOCUMENTS 8,999,552 B2 * 4/2015 Ogasawara ............ H01R 9/226
429/121
9,960,401 B2 5/2018 Takase et al.
(Continued)

FOREIGN PATENT DOCUMENTS

| JP | 2014-127229 | 7/2014 |
|----|-------------|--------|
| JP | 2017-084491 | 5/2017 |

(Continued)

OTHER PUBLICATIONS

Official Communication issued in International Bureau of WIPO Patent Application No. PCT/JP2018/019638, dated Aug. 7, 2018.

*Primary Examiner* — Briggitte R. Hammond
(74) *Attorney, Agent, or Firm* — Greenblum & Bernstein, P.L.C.

(57) ABSTRACT

An external connection busbar holding module includes: a first external connection busbar includes a bolt-fastening portion that is bent orthogonal to one end, and to which an external connection component is to be bolted, the bolt-fastening portion being provided at another end; and an external connection busbar protector that holds the first external connection busbar. The external connection busbar (Continued)

protector includes a positioning portion into which the bolt-fastening portion is inserted, and that positions the first external connection busbar. The positioning portion includes an entrance portion having a predetermined clearance relative to the bolt-fastening portion, and a clearance reduction portion that reduces the predetermined clearance.

8 Claims, 9 Drawing Sheets

(56) References Cited

U.S. PATENT DOCUMENTS

| | | |
|---|---|---|
| 10,389,072 B2 * | 8/2019 | Fukushima ........ H01R 13/6215 |
| 2014/0134884 A1 * | 5/2014 | Okamoto ................ B60L 58/10 |
| | | 439/627 |
| 2014/0322982 A1 | 10/2014 | Nakayama |
| 2016/0197330 A1 | 7/2016 | Takase et al. |
| 2016/0293925 A1 | 10/2016 | Nakayama et al. |

FOREIGN PATENT DOCUMENTS

| | | |
|---|---|---|
| WO | 2013/021538 | 2/2013 |
| WO | 2013/084713 | 6/2013 |
| WO | 2015/076034 | 5/2015 |
| WO | 2017/068966 | 4/2017 |
| WO | 2017/073319 | 5/2017 |

* cited by examiner

US 10,608,230 B2

EXTERNAL CONNECTION BUSBAR HOLDING MODULE AND CONNECTION MODULE

TECHNICAL FIELD

The present specification discloses a technique that relates to an external connection busbar holding module, and a connection module including the external connection busbar holding module.

BACKGROUND ART

Conventionally, external connection busbars described in Patent Document 1 are known as examples of external connection busbars that are connected to output electrode terminals of an electricity storage element group. Patent Document 1 describes, in a battery module (electricity storage module) M1 that has a configuration in which a pair of output electrode terminals are used as electrode terminals of electricity storage elements at opposite ends of an electricity storage element group, external connection busbars 19B that are connected to the electrode terminals of the electricity storage elements at the opposite ends. In this configuration, the external connection busbars 19B are held by a resin protector 20, together with busbars 19 that connect the electrode terminals of the electricity storage elements.

CITATION LIST

Patent Document
Patent Document 1: JP 2014-127229A

SUMMARY OF INVENTION

Technical Problem

When the arrangement of a plurality of electricity storage elements of the electricity storage element group is the same as that of Patent Document 1 above, or in other words, when electricity storage elements having the shape of a solid rectangular with a small thickness are arranged in the thickness direction, the supply of power from the electricity storage element group to an external device through the external connection busbars may be carried out from the same end side of the electricity storage element group. In this case, the external connection busbar that is connected to one of a pair of output electrode terminals needs to be disposed over a long distance to the other end of the electricity storage element group. That is, an elongated external connection busbar and a holding member that holds the elongated external connection busbar are required.

It is often the case that an external connection component, such as an external device connection busbar for connecting an external connection busbar to an external device to which the power from the electricity storage element group is supplied, is fastened with a bolt to each of the external connection busbars. In addition, for absorbing the product deviation and facilitating attachment, a predetermined clearance (gap) is often provided between an external connection busbar and the holding member of the external connection busbar. In this case, when the external connection component is bolted to an external connection busbar that is connected to the other output electrode terminal, a torque load is likely to be generated with the rotation of the bolt due to the aforementioned clearance, and the generated torque load will be applied to the connection portion between the elongated external connection busbar and the output electrode terminal. The elongated external connection busbar and the output electrode terminal may sometimes be connected through welding, such as laser welding. In that case, settings are necessary that minimize the load applied to the laser welded portion during bolting the external connection component.

When the welded surface of the external connection busbar and the bolt-fastening portion are orthogonal to each other, the positioning of the external connection busbar needs to be performed in the plate thickness direction. If the thickness of the external connection busbar is small, the thickness of the external connection busbar insertion portion of a resin component relative to that which the external connection busbar is to be positioned is also small, and, therefore, the thickness of the molding mold is also small. Accordingly, the molding mold used for producing the holding member needs to be provided with fine portions, and there is also concern that the molding mold will break, or that the mountablility of the external connection busbar to the holding member will degrade.

The technique disclosed in the present specification has been completed in light of the above-described circumstances, and provides an external connection busbar holding module with which it is possible to maintain the reliability of connection between an external connection busbar and the output electrode terminals of an electricity storage element group, while maintaining a desired manufacturing efficiency.

Solution to Problem

An external connection busbar holding module disclosed in the present specification is an external connection busbar holding module that is to be attached to an electricity storage element group including a plurality of electricity storage elements each including positive and negative electrode terminals, the electricity storage element group including a first output electrode terminal that outputs power of one polarity, and a second output electrode terminal that outputs power of another polarity, the external connection busbar holding module including: a first external connection busbar whose one end is to be connected to the first output electrode terminal, the first external connection busbar including, at another end thereof, a bolt-fastening portion that is bent orthogonal to the one end, and to which an external connection component is to be bolted; and an external connection busbar protector that holds the first external connection busbar, wherein the external connection busbar protector includes a positioning portion into which the bolt-fastening portion is inserted, and that positions the first external connection busbar, and the positioning portion includes an entrance portion having a predetermined clearance relative to the bolt-fastening portion, and a clearance reduction portion that reduces the predetermined clearance.

With the present configuration, the positioning portion includes the entrance portion having a predetermined clearance relative to the bolt-fastening portion, and the clearance reduction portion that reduces the predetermined clearance. That is, the positioning portion is configured to reduce the clearance for a portion of the bolt-fastening portion of the first external connection busbar that is inserted thereinto. Accordingly, when the bolt-fastening portion is bolted, it is possible, with the clearance reduction portion, to prevent generation of the torque load due to rotation of the bolt with clearance. Additionally, the operability will not be reduced when the bolt-fastening portion is attached by being inserted into the positioning portion. Furthermore, it is possible to reduce fine portions in a molding mold used for manufacturing the positioning portion of the external connection busbar protector, thus making it possible to inhibit breakage of the molding mold. That is, it is possible to maintain the reliability of connection between the external connection busbar and the output electrode terminals of the electricity storage element group, while maintaining the desired manufacturing efficiency.

In the above-described external connection busbar holding module, the external connection busbar protector may include the positioning portions at positions corresponding to opposite end portions of the bolt-fastening portion in a width direction, and the clearance reduction portion may clamp an end portion of the bolt-fastening portion.

With the present configuration, the positioning portions are provided only at positions corresponding to opposite end portions of the bolt-fastening portion in the width direction, and it is therefore possible to further reduce fine portions in a molding mold used for manufacturing the positioning portions. This can further inhibit breakage of the molding mold.

In the above-described external connection busbar holding module, the external connection busbar protector may include fixing pawls that fix the first external connection busbar in locations close to the respective corresponding positioning portions, and the first external connection busbar may have openings in which the fixing pawls are respectively locked to bent portions extending continuously with the bolt-fastening portion.

With the present configuration, when the positioning portions are provided only at positions corresponding to opposite end portions of the bolt-fastening portion in the width direction, the ability of the external connection busbar protector to hold the first external connection busbar is enhanced by the fixing pawls.

In the above-described external connection busbar holding module, the external connection busbar protector may include a nut accommodating portion that accommodates a nut to be bolt-fastened, and that has a fastening clearance serving as a clearance relative to the nut before being bolt-fastened, and the clearance reduction portion may have a clearance smaller than the fastening clearance.

With the present configuration, even when the nut accommodating portion is provided with a clearance (fastening clearance) relative to the nut, it is possible, with the clearance reduction portion, to prevent generation of the torque load due to the clearance with rotation of a bolt when the bolt-fastening portion is bolted.

In the above-described external connection busbar holding module, a connection portion between the one end of the first external connection busbar and the first output electrode terminal may be a welded connection portion.

Ordinarily, the influence of the rotational torque exerted when the bolt-fastening portion is bolted is more significant when the connection portion between one end of the first external connection busbar and the first output electrode terminal is welded, for example, laser welded, than when the connection portion is bolted. Therefore, with the present configuration, in which the connection portion is welded, it is possible to more effectively utilize the effect of reducing the influence of the rotational torque.

The above-described external connection busbar holding module may further include a second external connection busbar that is held by the external connection busbar protector, the second external connection busbar having one end that is to be connected to the second output electrode terminal, and another end that includes a bolt-fastening portion, wherein the external connection busbar protector may hold the second external connection busbar, and includes the positioning portion corresponding to the bolt-fastening portion of the second external connection busbar.

With the present configuration, also for the second external connection busbar, which does not necessarily have an elongated plate shape, it is possible to maintain the reliability of connection to the output electrode terminals of the electricity storage element group, while maintaining the desired manufacturing efficiency.

In the above-described external connection busbar holding module, the first external connection busbar may have a length extending from the electricity storage element at one end of the electricity storage element group to the electricity storage element at another end thereof.

It can be said that the influence of the rotational torque exerted when the bolt-fastening portion is bolted increases as the length of the first external connection busbar increases. Therefore, with the present configuration, in which the first external connection busbar has a length extending from one end to the other end of the electricity storage element group, it is possible to more effectively utilize the effect of reducing the influence of the rotational torque.

A connection module disclosed in the present specification is a connection module that is to be attached to an electricity storage element group including a plurality of electricity storage elements each including positive and negative electrode terminals, the connection module including: any of the above-described external connection busbar holding modules; and a busbar holding module including a plurality of busbars that connect the positive electrode terminal and the negative electrode terminal of adjacent electricity storage elements to each other, and an insulating protector that holds the plurality of busbars.

Advantageous Effects of Invention

With the external connection busbar holding module disclosed in the present specification, it is possible to maintain the reliability of connection between an external connection busbar and the output electrode terminals of an electricity storage element group, while maintaining the desired manufacturing efficiency.

DESCRIPTION OF EMBODIMENTS

Embodiment

Figure 1:
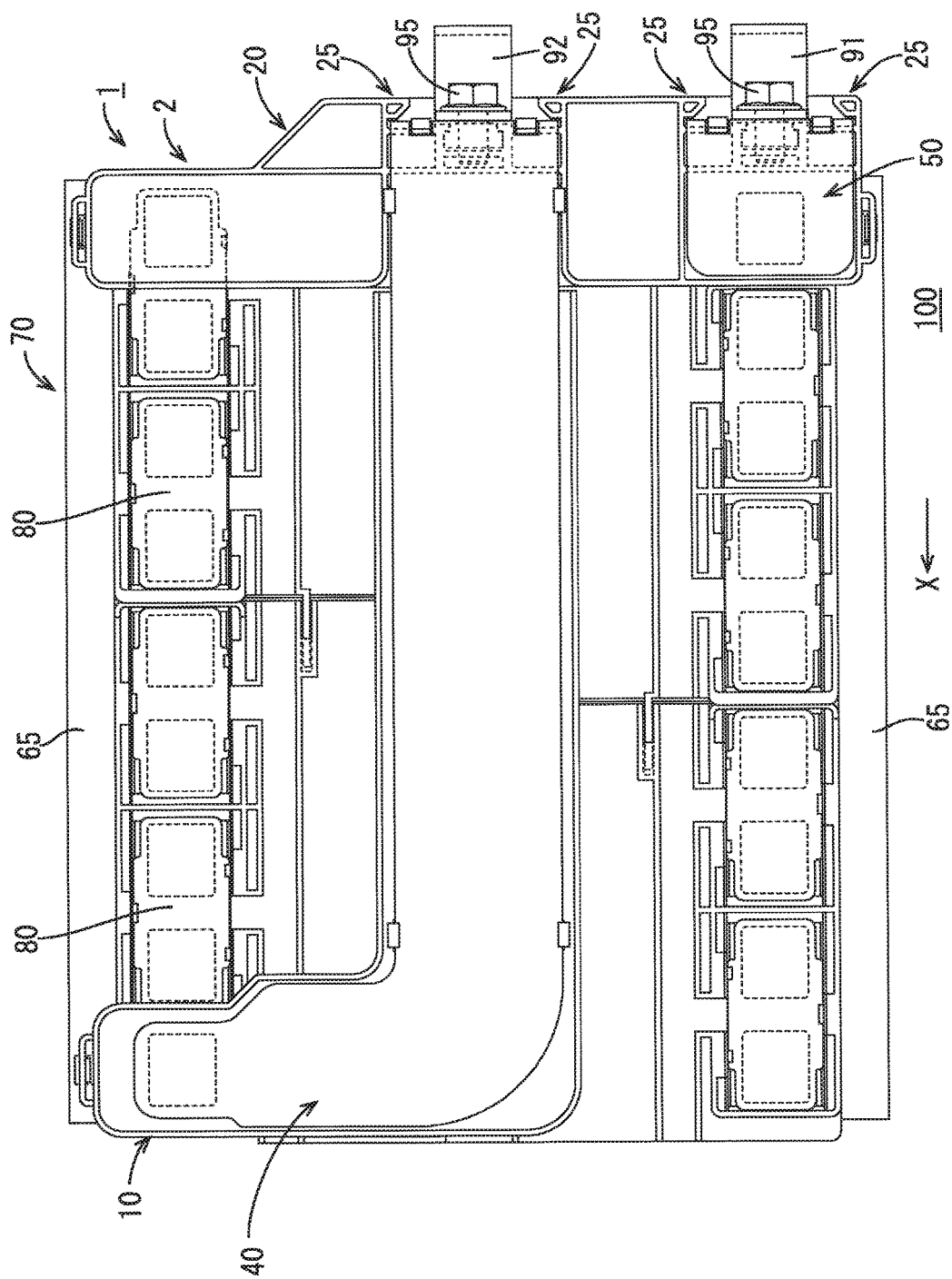
FIG. 1 is a plan view of an electricity storage module including a connection module according to an embodiment.
Figure 2:
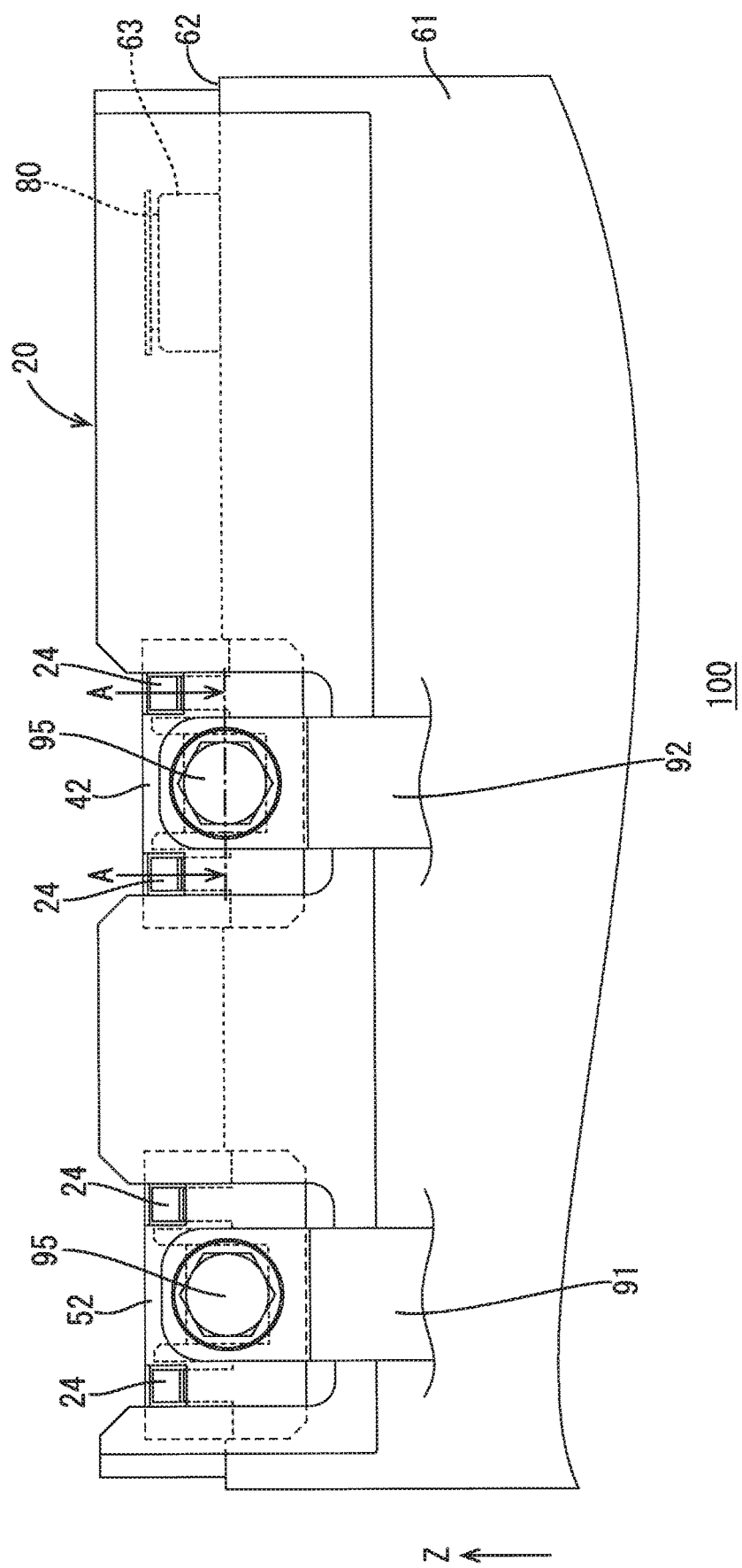
FIG. 2 is a side view of the electricity storage module.
Figure 3:
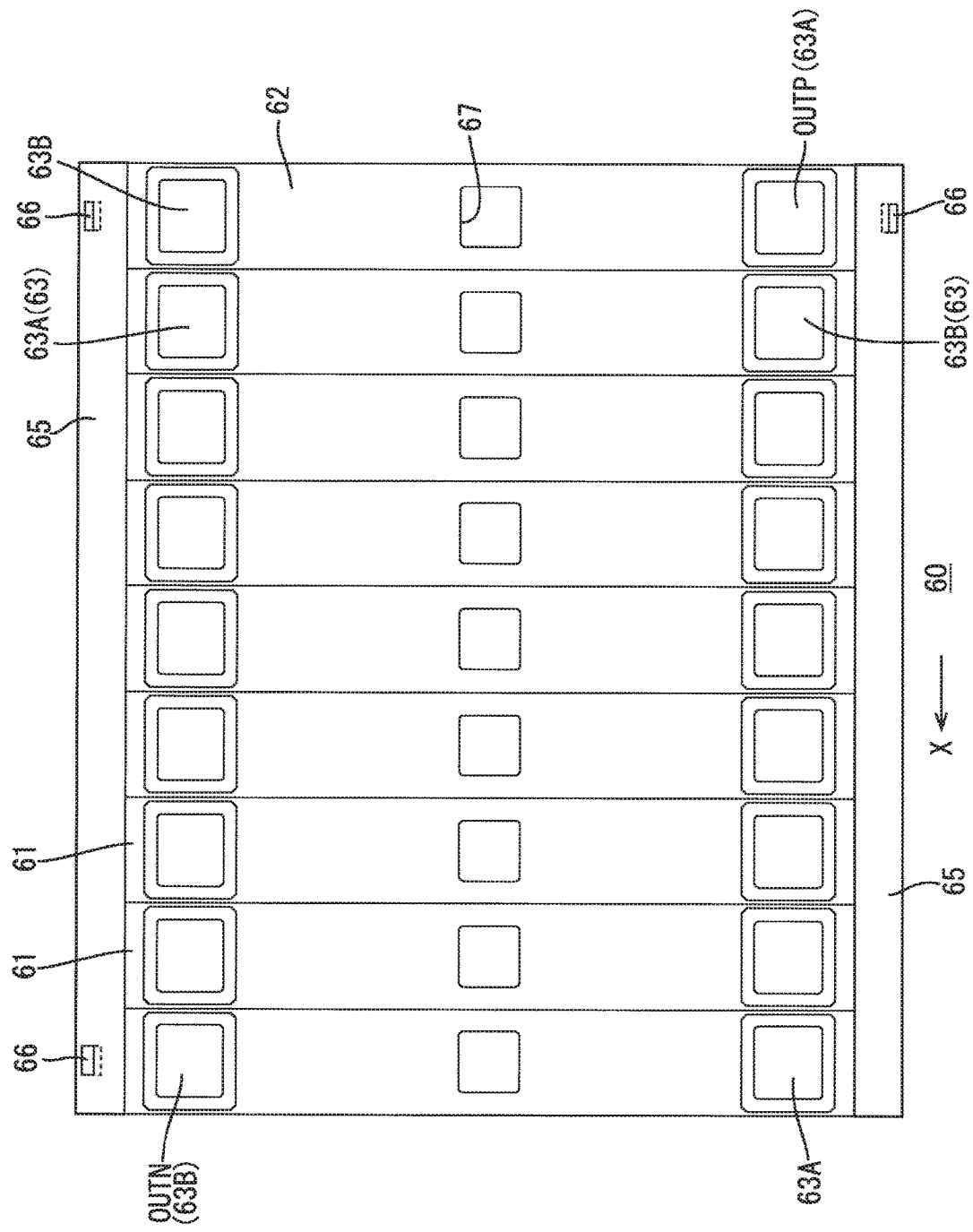
FIG. 3 is a plan view of an electricity storage element group.

An embodiment will be described with reference to FIGS. 1 to 9. Note that the following description will be given, assuming that the direction indicated by the arrow X in FIGS. 1 and 3 is the left direction, and the direction indicated by the arrow Z in FIG. 2 is the upper direction. For a plurality of identical members, a reference numeral may be assigned to one member, and reference numerals omitted for the other members.

An electricity storage module 100 described in the present embodiment can be installed in a vehicle (not shown) such as an electric automobile or a hybrid automobile, and used as a power source for driving the vehicle, for example.

1. Configuration of Electricity Storage Module

As shown in FIGS. 1 and 3, the electricity storage module 100 of the present embodiment is mainly composed of an electricity storage element group 60 (see FIG. 3) formed by arranging a plurality (nine in the present embodiment) of electricity storage elements 61 side-by-side, and a connection module 1 attached onto the electricity storage element group 60. In the following, the electricity storage element group 60 will be described briefly.

1-1. Electricity Storage Element Group and Electricity Storage Element

Each electricity storage element 61 according to the present embodiment may be a secondary battery, for example. As shown in FIG. 3, a plurality of electricity storage elements 61 are arranged in a row, and form the electricity storage element group 60.

Each of the electricity storage elements 61 has the shape of a solid rectangular with a flat contour, and has an electrode arrangement surface 62 that is perpendicular to a surface thereof opposing an adjacent electricity storage element 61, as shown in FIG. 3. A pair of electrode terminals 63 are disposed on the electrode arrangement surface 62 at positions near opposite end portions in the longitudinal direction thereof. One of the electrode terminals 63 is a positive electrode terminal 63A and the other is a negative electrode terminal 63B. Each of the electrode terminals 63 is made of a metal, and protrudes in a rectangular tubular shape from the electrode arrangement surface 62 (see FIG. 2).

At the central portion of the electrode arrangement surface 62 of each of the electricity storage elements 61, a locking groove 67 with which a locking portion 77 of a busbar holding module 70, which will be described later, is engaged is provided (see FIG. 3). As a result of the locking portion 77 being locked to the locking groove 67, the connection module 1 is mounted to the upper portion of the electricity storage element group 60.

As shown in FIG. 3, locking portions 65 for locking an external connection busbar holding module 2, which will be described later, are provided at opposite end portions of the electricity storage element 61 in the longitudinal direction. The locking portions 65 are provided with locking holes 66 for locking locking pieces 15, 26A, and 26B of the external connection busbar holding module 2. As a result of the locking pieces 15, 26A, and 26B being locked to the locking holes 66, the external connection busbar holding module 2 is mounted to the upper portion of the electricity storage element group 60.

The plurality of electricity storage elements 61 are arranged such that electrode terminals 63 of different polarities are disposed adjacent to each other in two adjacent electricity storage elements 61 (i.e., the positive electrode terminal 63A of one electricity storage element 61 and the negative electrode terminal 63B of another electricity storage element 61 adjacent thereto are disposed adjacent to each other). Also, as shown in FIG. 3, in the present embodiment, the negative electrode terminal 63B of the electricity storage element 61 at the left end is used as a negative electrode output terminal OUTN, and the positive electrode terminal 63A of the electricity storage element 61 at the right end is used as a positive electrode output terminal OUTP.

2. Connection Module

As shown in FIG. 1, the connection module 1 includes a busbar holding module 70 and an external connection busbar holding module 2, and is attached to the upper portion of the electricity storage element group 60.

2-1. Configuration of Busbar Holding Module

Figure 4:
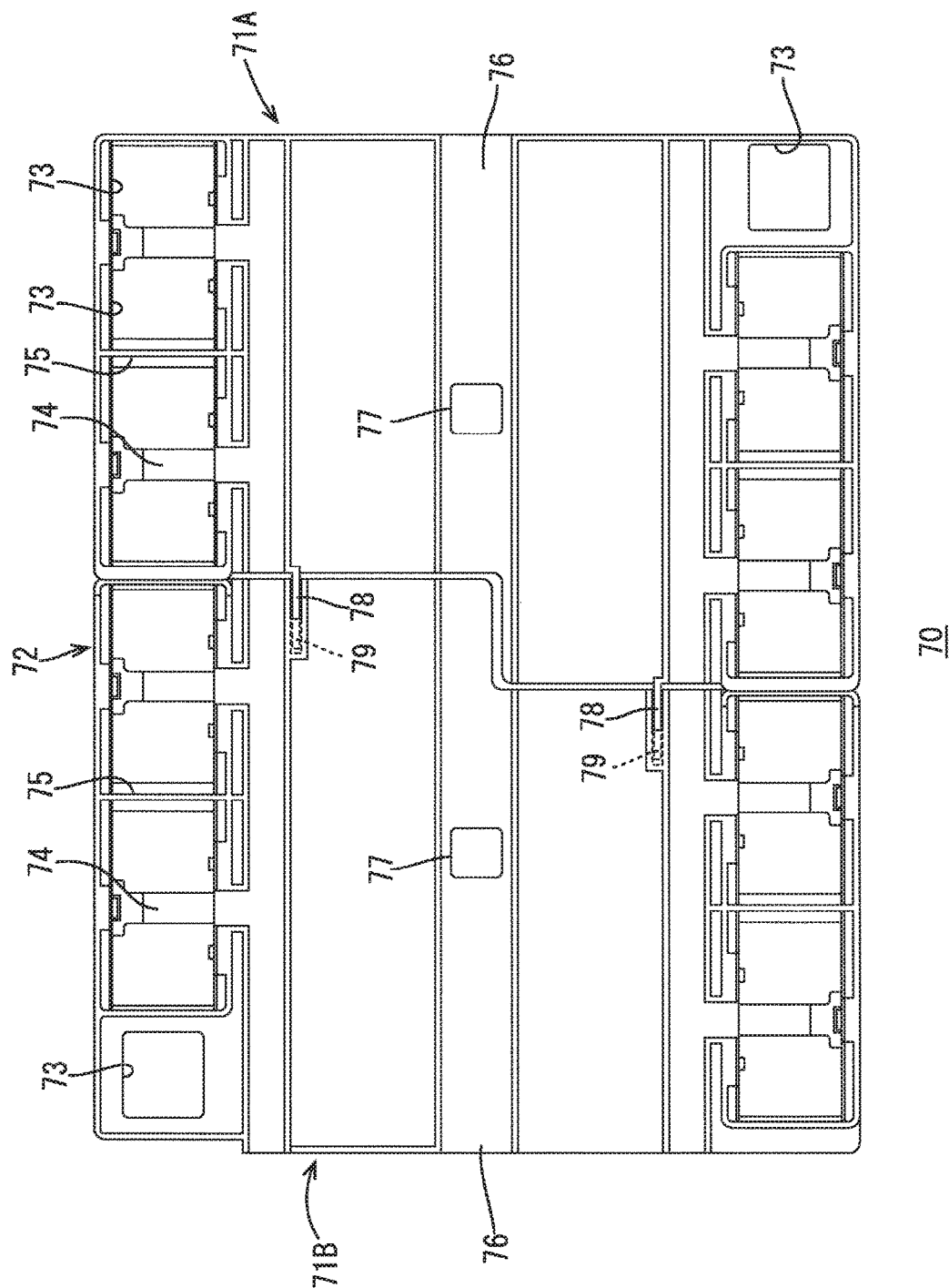
FIG. 4 is a plan view of a busbar holding module.

The busbar holding module 70 is a member that is mounted to a surface formed by the electrode arrangement surfaces 62 of the electricity storage elements 61 in the electricity storage element group 60. As shown in FIG. 4, the busbar holding module 70 includes two insulating protectors (71A, 71B), a plurality of busbars 80 (see FIG. 1) that are held by the insulating protectors (71A, 71B) and connect the positive electrode terminal 63A and the negative electrode terminal 63B of adjacent electricity storage elements 61, a voltage detection terminal (not shown) that is disposed overlapping with and electrically connected to the busbar 80, a detection wire (not shown) that is connected to the voltage detection terminal, and so forth. In the following, when there is no need to distinguish between the insulating protectors (71A, 71B), each of the insulating protectors will be referred to as the insulating protector 71.

Each busbar 80 is formed by punching a metal plate, and constitutes a plate-shaped member that has a substantially rectangular shape as a whole and whose four corners have been cut out into a flat rectangular shape, as shown in FIG. 1. Examples of the material of the busbar 80 include copper, a copper alloy, aluminum, an aluminum alloy, and stainless steel (SUS). Each busbar 80 may be joined to the electrode terminals 63 through laser welding, for example.

In the present embodiment, two insulating protectors 71 are arranged side-by-side along the arrangement direction of the plurality of electricity storage elements 61. Each of the insulating protectors 71 is constituted by an insulating member made of a synthetic resin or the like. Note that the number of insulating protectors 71 is not limited to two. The number of insulating protectors 71, or in other words, the number of divisions of the insulating protectors 71 may be determined as appropriate according to the size of the electricity storage element group 60, i.e., the number of the electricity storage elements 61.

As shown in FIG. 4, the insulating protectors 71 include a plurality (four in the present embodiment) of busbar holding portions 72 that are open in the up-down direction and that accommodate and hold the busbars 80. The busbar holding portions 72 are provided so as to correspond to the electrode terminals 63 of the electricity storage elements 61, and to be separated at opposite end portions of each of the insulating protectors 71 in a direction perpendicular to the arrangement direction (the arrow X direction) of the electricity storage elements. The separated busbar holding portions 72 are coupled by a coupling portion 76. Each of the busbar holding portions 72 includes an opening 73 corresponding to the electrode terminal 63, a busbar placement portion 74, and so forth.

Each busbar holding portion 72 has a rectangular tubular accommodating wall 75 that holds the busbars 80 therein such that adjacent busbars 80 are insulated from each other.

The accommodating wall 75 also functions as a protection wall for adjacent electrode terminals 63. Each insulating protector 71 is provided with an engaging portion 78 and an engaging receiving portion 79 for being coupled to an insulating protector 71 adjacent thereto. In addition, each insulating protector 71 is provided with a locking portion 77 that is locked to the locking groove 67 of the corresponding electricity storage element 61.

2-2. Configuration of External Connection Busbar Holding Module

Figure 5:
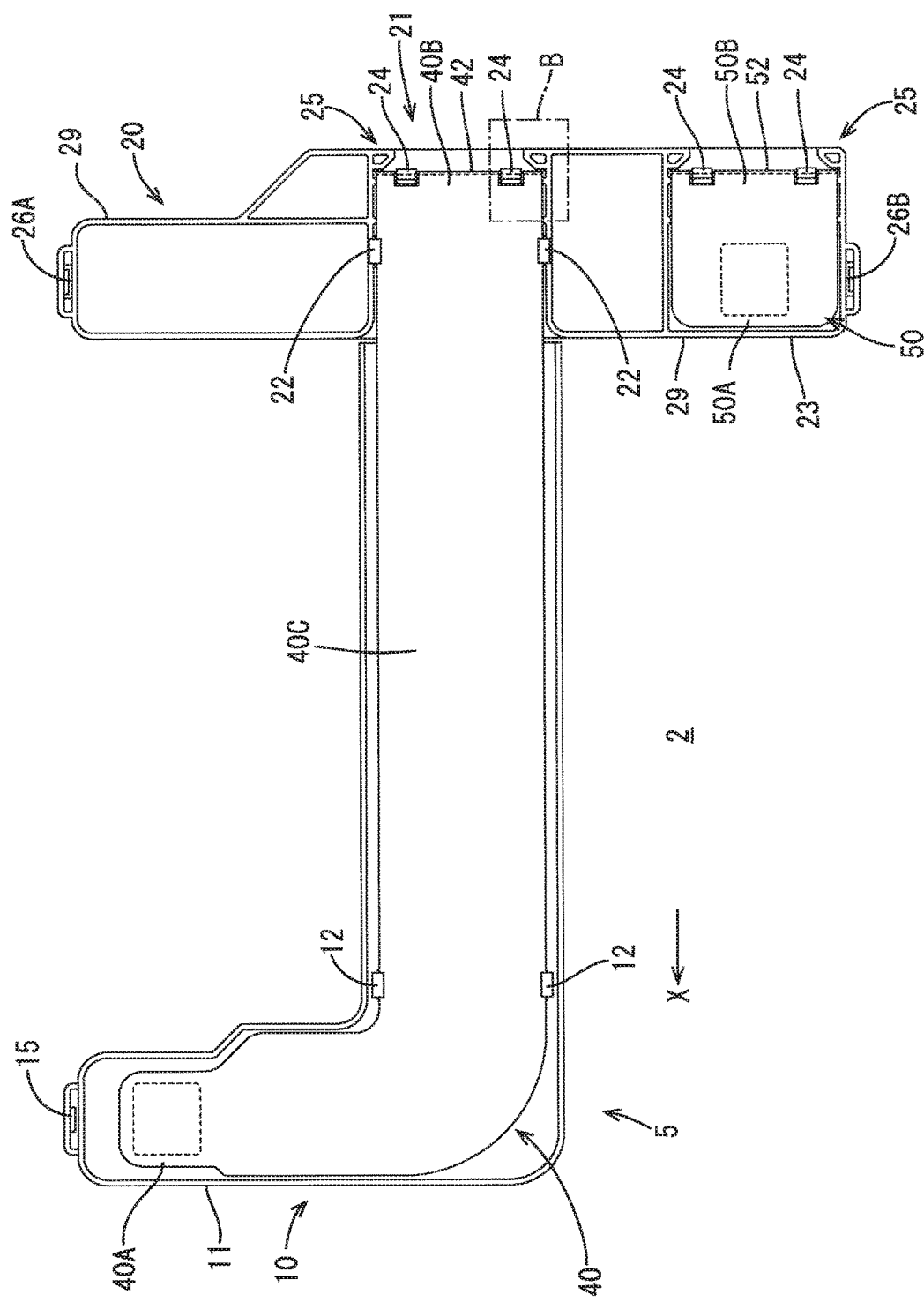
FIG. 5 is a plan view of an external connection busbar holding module.

As shown in FIG. 5, the external connection busbar holding module 2 includes an external connection busbar protector 5, a negative electrode external connection busbar 40, and a positive electrode external connection busbar 50. The external connection busbar protector 5 includes a first protector portion 10 and a second protector portion 20 that are formed separately.

The negative electrode external connection busbar 40 is connected to the negative electrode output terminal OUTN (see FIG. 3) of the electricity storage element group 60, out of the pair of output electrode terminals (OUTP and OUTN) for outputting power to the outside.

The negative electrode external connection busbar 40 is a thin plate extending in the arrangement direction (the arrow X direction in FIG. 5) of the plurality of electricity storage elements 61, and has an elongated plate shape. In other words, the negative electrode external connection busbar 40 has a length extending from the electricity storage element 61 at one end of the electricity storage element group 60 to the electricity storage element 61 at the other end thereof (see FIGS. 1 and 3).

More specifically, as shown in FIG. 5, the negative electrode external connection busbar 40 includes a first electrode connection portion (corresponding to one end) 40A that is connected to the negative electrode output terminal OUTN of the electricity storage element group 60, a first external connection portion (corresponding to the other end) 40B that is connected to an external device to which power is supplied from the electricity storage element group 60, and an intermediate portion 40C located between the first electrode connection portion 40A and the first external connection portion 40B. As shown in FIG. 5, the intermediate portion 40C has a shape extending from the first electrode connection portion 40A to the first external connection portion 40B.

A bolt-fastening portion 42 for connecting the negative electrode external connection busbar 40 to an external device connection busbar (an example of the "external connection component") 92 is formed at the first external connection portion 40B (see FIG. 2). The bolt-fastening portion 42 is bent extending orthogonal to the first electrode connection portion 40A, and the external device connection busbar 92 is bolted thereto (see FIG. 1). A through hole 42A for enabling connection to the external device connection busbar 92 is formed in the bolt-fastening portion 42 (see FIG. 8).

Figure 9:
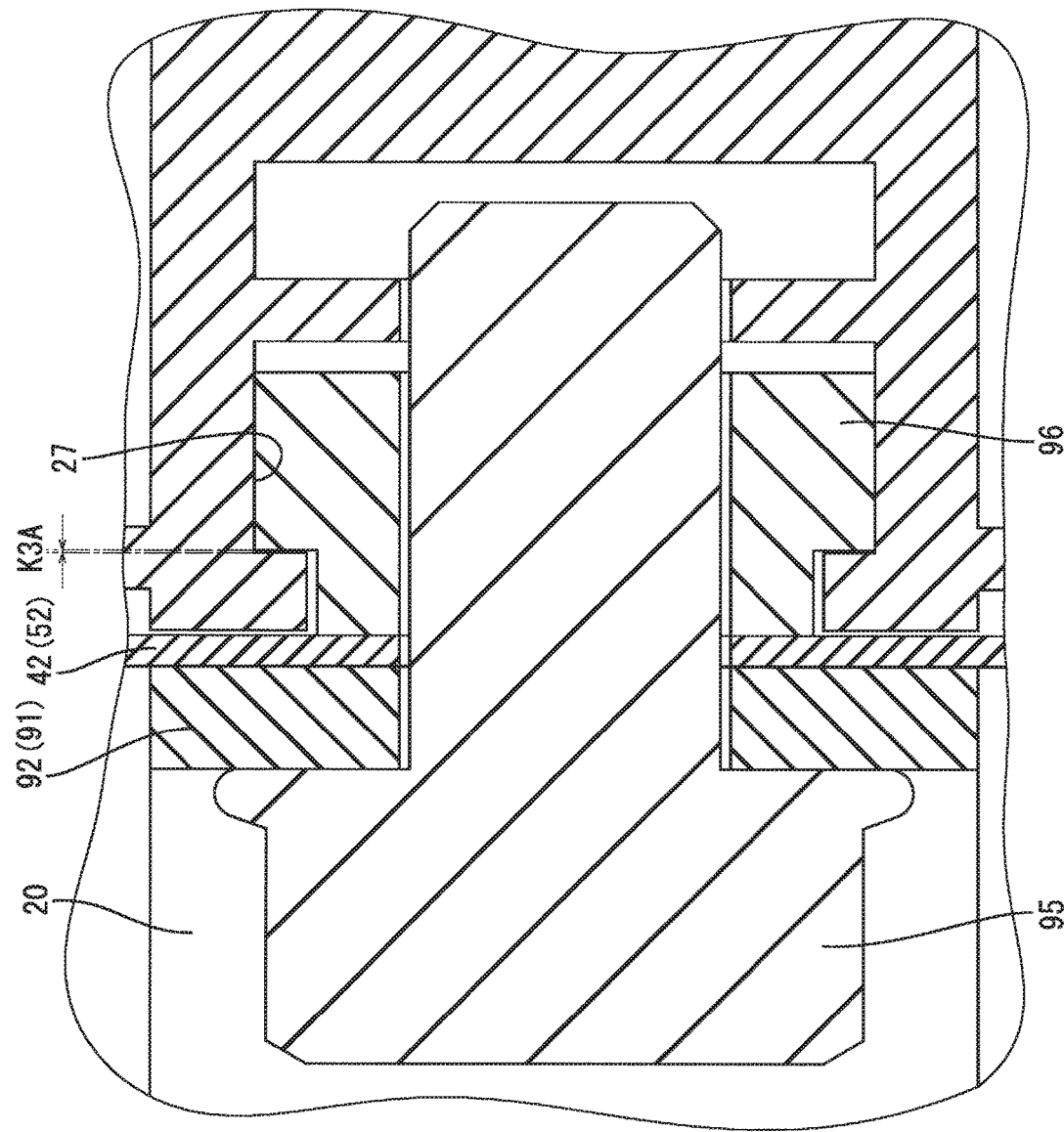
FIG. 9 is a partial cross-sectional view taken along the lines A-A in FIG. 2 after bolt-fastening.

That is, as shown in FIG. 5, the negative electrode external connection busbar 40 has a shape extending in the arrangement direction (the arrow X direction) of the electricity storage elements, the first electrode connection portion 40A, which is one end of the negative electrode external connection busbar 40, is connected to the negative electrode output terminal OUTN (first output electrode terminal), and the first external connection portion 40B, which is the other end thereof (more specifically, the first bolt-fastening portion 42 of the first external connection portion 40B) is bolted to the external device connection busbar 92 (see FIG. 9). The negative electrode external connection busbar 40 is an example of the "first external connection busbar".

As shown in FIG. 5, the positive electrode external connection busbar 50 includes a second electrode connection portion 50A that is connected to the positive electrode output terminal OUTP of the electricity storage element group 60, and a second external connection portion 50B that is connected to the external device to which power is supplied from the electricity storage element group 60. Similarly to the first external connection portion 40B, a bolt-fastening portion 52 for connecting the positive electrode external connection busbar 50 to the external device is formed bent in the vertical direction at the second external connection portion 50B (see FIG. 2). A through hole 52A for enabling connection to the external device connection busbar 91 is formed in the bolt-fastening portion 52 (see FIG. 8).

That is, the second electrode connection portion 50A, which is one end of the second external connection busbar 50, is connected to the positive electrode output terminal OUTP (the second output electrode terminal), and the second external connection portion 50B, which is the other end thereof, more specifically, the bolt-fastening portion 52 of the second external connection portion 50B, is bolted to the external device connection busbar 91 (see FIG. 9). The positive electrode external connection busbar 50 is an example of the "second external connection busbar".

Note that the arrangement is not limited thereto, and may be reversed, i.e., the "first external connection busbar" may be used as the positive electrode external connection busbar, and the "second external connection busbar" may be used as the negative electrode external connection busbar. That is, according to the arrangement of the electricity storage elements 61 of the electricity storage element group 60, the first external connection busbar 40 may be used as the positive electrode external connection busbar, and the second external connection busbar 50 may be used as the negative electrode external connection busbar.

The first protector portion 10 is constituted by an insulating member made of a synthetic resin or the like, and, includes, for example, a busbar holding portion 11, first locking portions 12, and a locking piece 15 as shown in FIG. 5.

The busbar holding portion 11 holds the first electrode connection portion 40A, which is one end of the negative electrode external connection busbar 40, in an insulated manner. More specifically, the busbar holding portion 11 also holds a portion of the intermediate portion 40C of the negative electrode external connection busbar 40.

As shown in FIG. 5, the first locking portions 12 lock one end portion of the intermediate portion 40C of the negative electrode external connection busbar 40.

A locking piece 15 is formed at the distal end portion of the busbar holding portion 11. The locking piece 15 couples the first protector portion 10, or in other words, the external connection busbar holding module 2, to the electricity storage element group 60 by being engaged with the corresponding one of the above-described locking holes 66 (see FIG. 2) formed in the electricity storage elements 61.

Similarly to the first protector portion 10, the second protector portion 20 is constituted by an insulating member made of a synthetic resin or the like, and includes, for example, a first busbar holding portion 21, second locking portions 22, a second busbar holding portion 23, an extending portion 29, and two locking pieces (26A, 26B) as shown in FIG. 5.

The first busbar holding portion 21 holds the first external connection portion 40B, which is the other end portion of the negative electrode external connection busbar 40, in an insulated manner. As shown in FIG. 5, the second locking portions 22 lock the negative electrode external connection busbar 40 in a location close to the first external connection portion 40B.

The second busbar holding portion 23 holds the positive electrode external connection busbar 50. The extending portion 29 is provided extending from the first busbar holding portion 21 in the width direction of the negative electrode external connection busbar 40 (a direction perpendicular to the arrow X direction in FIG. 5), and the locking pieces 26A and 26B are formed at opposite end portions of the extending portion 29. The locking pieces 26A and 26B couple the second protector portion 20, or in other words, the external connection busbar holding module 2, to the electricity storage element group 60 by being engaged with the respective corresponding locking holes 66 (see FIG. 2) formed in the electricity storage elements 61.

The second protector portion 20 holds the positive electrode external connection busbar (second external connection busbar) 50 at one end portion (one end portion of the extending portion 29) in a direction perpendicular to the arrangement direction (the arrow X direction in FIG. 5) of the plurality of electricity storage elements.

Figure 7:
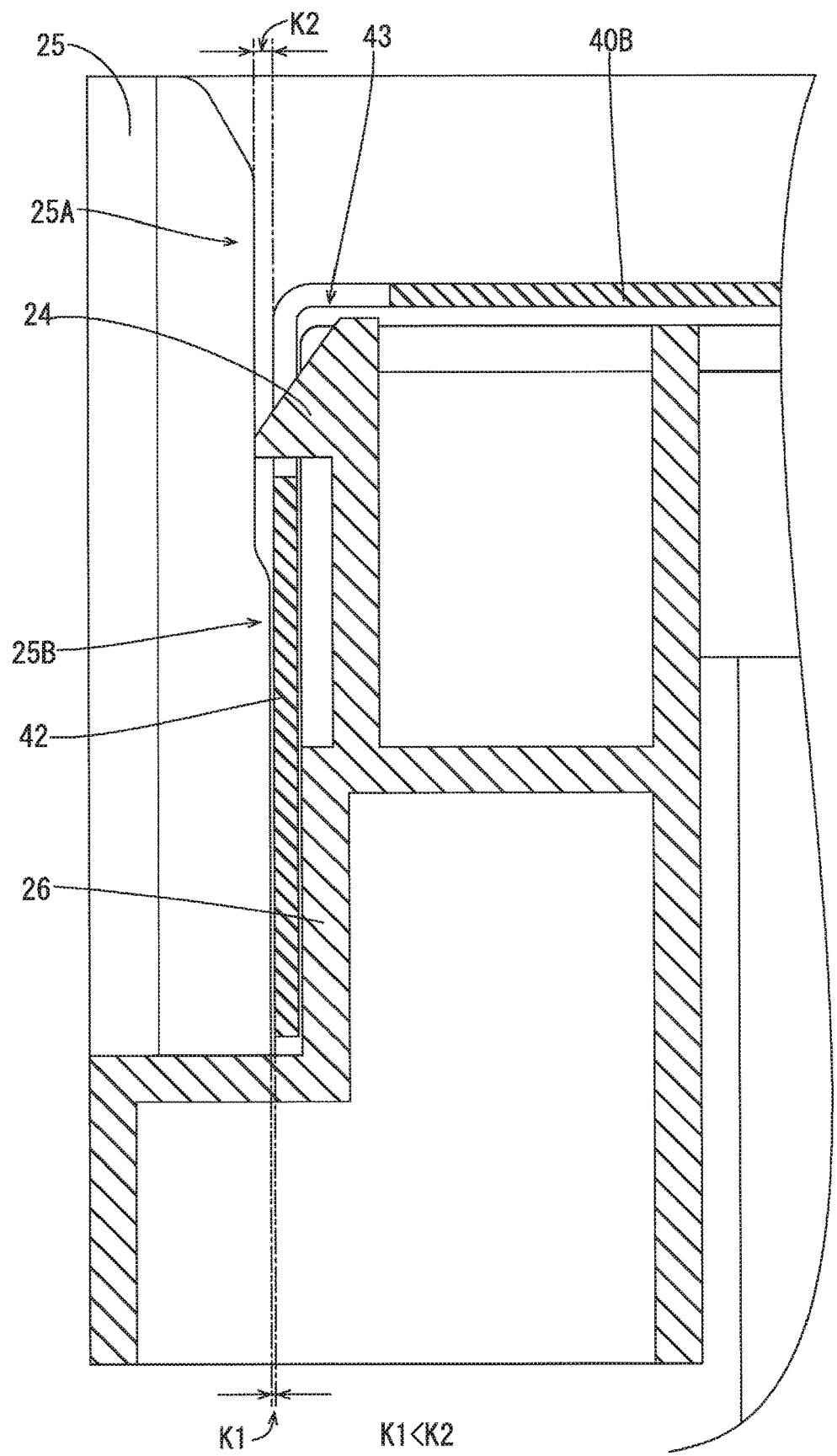
FIG. 7 is a cross-sectional view taken along the line C-C in FIG. 6.

As shown in FIG. 5, the second protector portion (external connection busbar protector) 20 includes positioning portions 25 that position the negative electrode external connection busbar 40 by the bolt-fastening portions 42 being inserted thereinto. As shown in FIG. 7, each positioning portion 25 includes an entrance portion 25A having a predetermined clearance K2 relative to the bolt-fastening portion 42, and a clearance reduction portion 25B that reduces the predetermined clearance K2. That is, as shown in FIG. 7, a reduction clearance K1 of the clearance reduction portion 25B is smaller than the predetermined clearance K2.

As shown in FIG. 5, in the present embodiment, the positioning portions 25 are formed at positions corresponding to opposite end portions of the bolt-fastening portion 42 in the width direction (a direction perpendicular to the arrow X direction), and the clearance reduction portions 25B clamp an end portion of the bolt-fastening portion 42.

Figure 6:
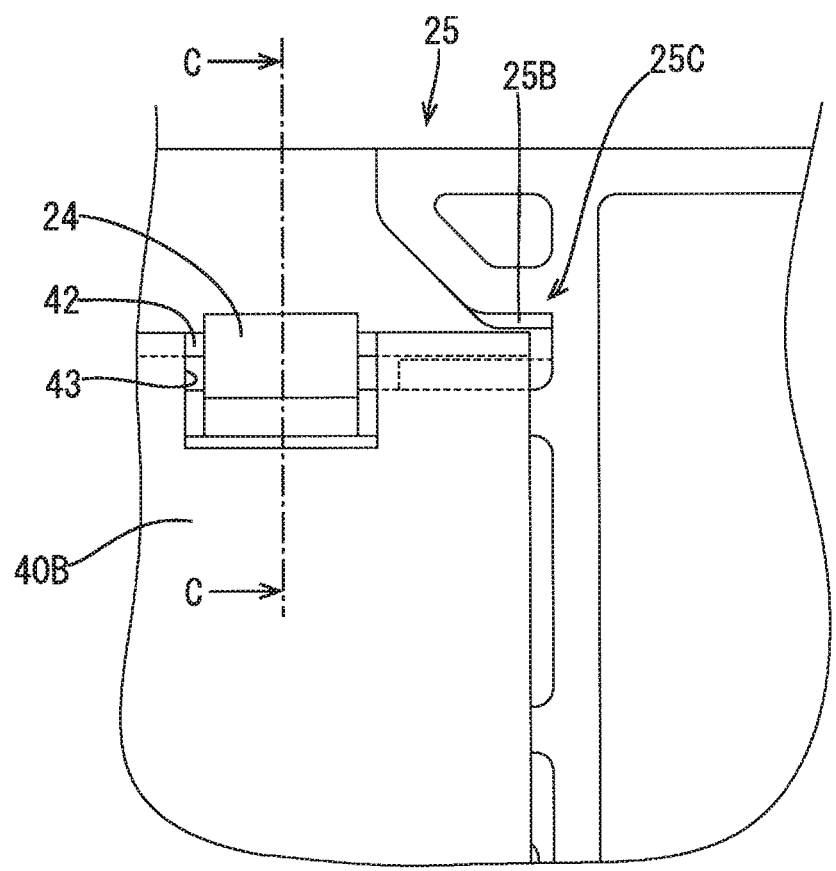
FIG. 6 is a partial enlarged view of FIG. 5.

As shown in FIGS. 5 and 6, the second protector portion (external connection busbar protector) 20 includes fixing pawls 24 that are located close to the respective corresponding positioning portions 25 and fix the negative electrode external connection busbar 40. Corresponding thereto, openings 43 in which the fixing pawls 24 are locked to a bent portion extending continuously with the bolt-fastening portion 42 are formed in the negative electrode external connection busbar 40.

Figure 8:
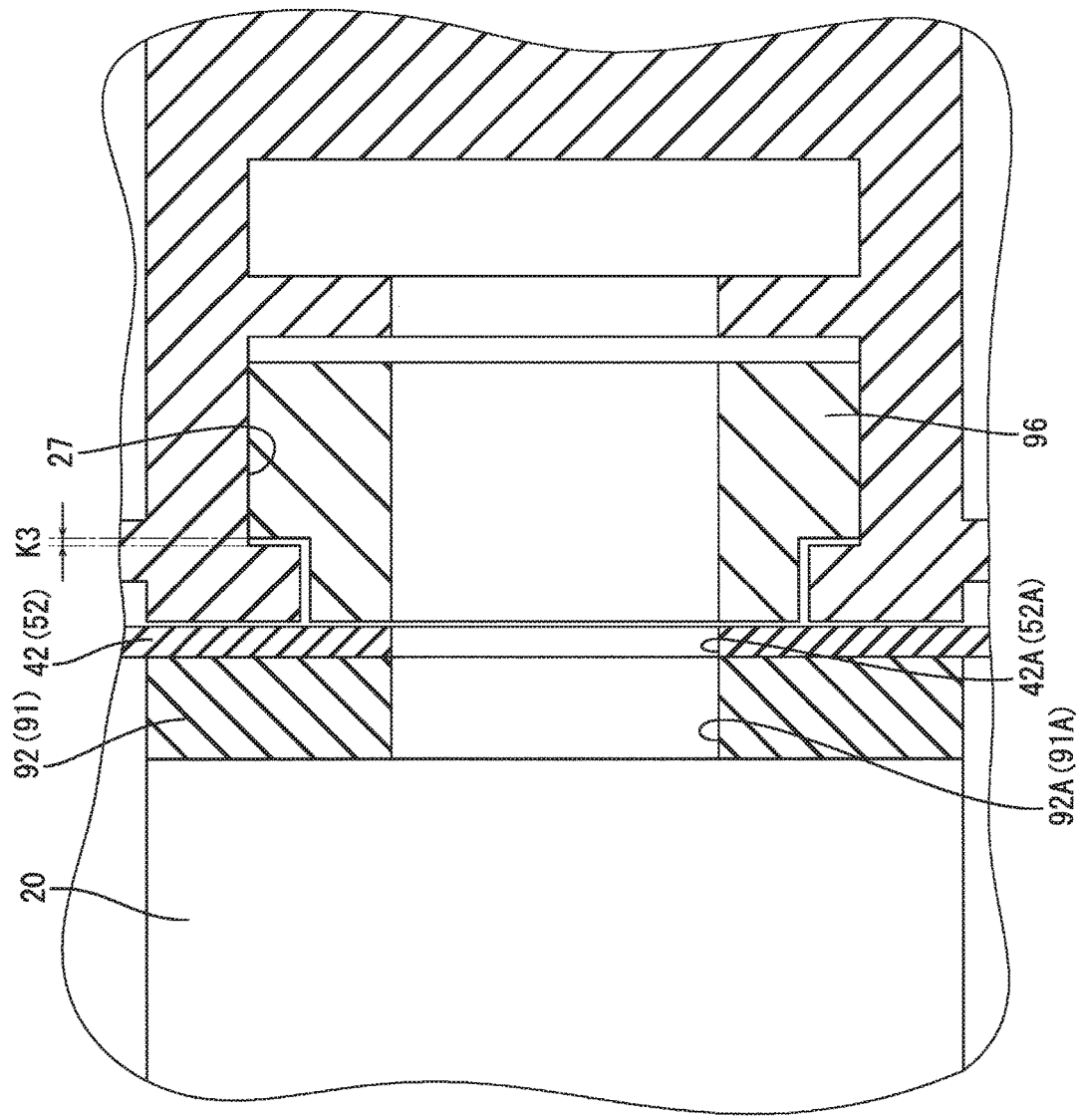
FIG. 8 is a partial cross-sectional view taken along the lines A-A in FIG. 2 before bolt-fastening.

As shown in FIG. 8, the second protector portion (external connection busbar protector) 20 includes a nut accommodating portion 27 that accommodates a nut 96 before being bolt-fasted, and that has a fastening clearance K3, which is a clearance with the nut 96 before being bolt-fastened. Here, the reduction clearance K1 of the clearance reduction portion 25B is smaller than the fastening clearance K3. For example, the reduction clearance K1 may be 0.1 mm, and the fastening clearance K3 may be 0.15 mm. FIG. 9 shows that the fastening clearance K3 is reduced as a result of bolt-fastening. A fastening clearance K3A after bolt-fastening is approximately 0.05 mm. Note that the reduction clearance K1 may be smaller than the fastening clearance K3A after bolt fastening.

In the present embodiment, also for the positive electrode external connection busbar 50, positioning portions 25 and a nut accommodating portion 27 that are the same as those of the negative electrode external connection busbar 40 are formed in the second protector portion 20, as shown in FIG. 5. Therefore, FIGS. 6 to 9 also show the structure of the second protector portion 20 for the positive electrode external connection busbar 50. Although an example is shown in which the external connection busbar protector 5 is formed by the first protector portion 10 and the second protector portion 20, the configuration of the external connection busbar protector 5 is not limited thereto. For example, the protector portions (10, 20) may be formed as a single protector formed as one piece, without being separated.

3. Method for Assembling Electricity Storage Module

When assembling the electricity storage module 100 of the present embodiment described above, the external connection busbar holding module 2 is assembled first. The bolt-fastening portion 42 of the negative electrode external connection busbar 40 is inserted into the positioning portions 25 of the second protector portion 20, thus attaching the negative electrode external connection busbar 40 to the external connection busbar protector 5. Similarly, the bolt-fastening portion 52 of the positive electrode external connection busbar 50 is inserted into the positioning portions 25 of the second protector portion 20, thus attaching the positive electrode external connection busbar 50 to the external connection busbar protector 5.

Next, the two insulating protectors (71A, 71B) are coupled to each other using the engaging portions 78 and the engaging receiving portions 79. The busbar holding module 70 formed as a result of the coupling is placed on the electrode arrangement surfaces 62 of the electricity storage element group 60. At that time, the insulating protectors 71 are mounted to the upper portion of the electricity storage element group 60 as a result of the locking portions 77 of the insulating protectors 71 being locked to the locking grooves 67 of the electricity storage elements 61.

Next, the external connection busbar holding module 2 to which the negative and positive electrode external connection busbars 40 and 50 have been attached is mounted to the upper portion of the electricity storage element group 60 from above the insulating protectors 71. At that time, the external connection busbar holding module 2 is fixed to the electricity storage element group 60 by locking the locking pieces 15, 26A, and 26B of the external connection busbar holding module 2 to the locking holes 66 of the electricity storage element group 60.

Next, the busbars 80 are accommodated in the busbar holding portions 72 of the insulating protectors 71, and the busbars 80 are joined to the electrode terminals 63 of the electricity storage elements 61 through laser welding. In addition, through welding, for example, laser welding, the negative electrode external connection busbar 40 is joined to the negative electrode output terminal OUTN, and the positive electrode external connection busbar 50 is joined to the positive electrode output terminal OUTP. Thus, an electricity storage module 100 as shown in FIG. 1 is completed. Note that welding is not limited to laser welding, and may be resistance welding or the like, for example.

As shown in FIGS. 1 and 2, in the electricity storage module 100, the external device connection busbar 92 and the external device connection busbar 91 are further bolted to the bolt-fastening portion 42 of the negative electrode external connection busbar 40 and the bolt-fastening portion 52 of the positive electrode external connection busbar 50, respectively, using bolts 95. At that time, since the positioning portions 25 are each provided with the clearance reduction portion 25B, it is possible to prevent the torque generated during bolting from being exerted on the connection portion 40A of the elongated negative electrode external connection busbar 40.

4. Effects of Embodiment

In the above-described embodiment, the positioning portions 25 of the second protector portion (external connection busbar protector) 20 each include the entrance portion 25A having a predetermined clearance relative to the bolt-fastening portion 42, and the clearance reduction portion 25B that reduces the predetermined clearance. That is, each positioning portion 25 is configured to reduce the clearance relative to a portion of the bolt-fastening portion 42 of the negative electrode external connection busbar 40 (first external connection busbar) that is inserted thereto. Accordingly, when the bolt-fastening portion 42 is bolted, it is possible, with the clearance reduction portion 25B, to prevent generation of the torque load due to rotation of the bolt with clearance. Additionally, the operability will not be reduced when the bolt-fastening portion 42 is attached by being inserted into the positioning portion 25. Furthermore, it is possible to reduce fine portions in a molding mold used for manufacturing the positioning portion 25, thus making it possible to inhibit breakage of the molding mold. That is, it is possible to maintain the reliability of connection between the elongated external connection busbar 40 and the output electrode terminal of the electricity storage element group 60, while maintaining the desired manufacturing efficiency.

The positioning portions 25 are provided only at positions corresponding to opposite end portions of the bolt-fastening portion 42 in the width direction. Accordingly, it is possible to further reduce fine portions in the molding mold used for manufacturing the positioning portions 25. This can further inhibit breakage of the molding mold.

The bolt-fastening portion 42 is fixed using the fixing pawls 24. Accordingly, even when the positioning portions 25 are provided only at positions corresponding to opposite end portions of the bolt-fastening portion 42 in the width direction, the ability of the second protector (external connection busbar protector) 20 to hold the negative electrode external connection busbar 40 is enhanced by the fixing pawls 24.

When the nut accommodating portion 27 is provided with the clearance (fastening clearance) K3 relative to a nut, it is also possible, with the clearance reduction portion 25B, to prevent generation of the torque load due to the clearance with rotation of a bolt when the bolt-fastening portion 42 is bolted.

Ordinarily, the influence of the rotational torque exerted when the bolt-fastening portion 42 is bolted is more significant when the connection portion between one end of the negative electrode external connection busbar 40 and the negative electrode output terminal OUTN is welded, for example, laser welded, than when the connection portion is bolted. Therefore, according to the present embodiment, in which the connection portion is welded, it is possible to more effectively utilize the effect of reducing the influence of the rotational torque exerted when the bolt-fastening portion 42 is bolted.

The positioning portions 25, the fixing pawls 24, and the fastening clearance K3 that are the same as those of the negative electrode external connection busbar 40 are provided also for the positive electrode external connection busbar 50. Accordingly, also for the positive electrode external connection busbar 50, which does not have an elongated plate shape, it is possible to maintain the reliability of connection to the positive electrode output terminal OUTP of the electricity storage element group 60, while maintaining the desired manufacturing efficiency.

It can be said that the influence of the rotational torque exerted when the bolt-fastening portion 42 is bolt increases as the length of the negative electrode external connection busbar 40 increases. Therefore, according to the present embodiment, in which the negative electrode external connection busbar 40 has a length extending from one end to the other end of the electricity storage element group 60, it is possible to more effectively utilize the effect of reducing the influence of the rotational torque.

Other Embodiments

The technique disclosed in the present specification is not limited to the above described and illustrated embodiment. For example, the following embodiments are also included in the technical scope thereof.

(1) In the above embodiment, an example is shown in which the positioning portions 25 are provided at two positions corresponding to opposite end portions of the bolt-fastening portion 42 in the width direction; however, the technique disclosed herein is not limited thereto. For example, the positioning portion 25 may be provided at one position located at the central portion of the bolt-fastening portion 42 in the width direction.

(2) In the above embodiment, an example is shown in which the fixing pawls 24 are provided at two locations; however, the technique disclosed herein is not limited thereto. The fixing pawl 24 may be provided at one location, or does not need to be provided.

(3) In the above embodiment, an example is shown in which the positioning portions 25, the fixing pawls 24, and the fastening clearance K3 that are the same as those of the negative electrode external connection busbar 40 are provided also for the positive electrode external connection busbar 50; however, the technique disclosed herein is not limited thereto. For example, the fixing pawl 24 may be omitted.

(4) In the above embodiment, an example is shown in which the negative electrode external connection busbar (first external connection busbar) 40 has a shape extending in the arrangement direction of the plurality of electricity storage elements 61 as an elongated shape having a length extending from the electricity storage element 61 at one end of the electricity storage element group 60 to the electricity storage element 61 at the other end thereof however, the technique disclosed herein is not limited thereto. For example, the negative electrode external connection busbar may have a shape extending in a direction perpendicular to the arrangement direction of the plurality of electricity storage elements 61, or does not need to have an elongated shape.

LIST OF REFERENCE NUMERALS

1 Connection module
2 External connection busbar holding module
5 External connection busbar protector
10 First protector portion
20 Second protector portion 24 Fixing pawl
25 Positioning portion
25A Entrance portion of positioning portion
25B Clearance reduction portion of positioning portion
27 Nut accommodating portion
40 Negative electrode external connection busbar (first external connection busbar)
40B The other end of negative electrode external connection busbar
42, 52 Bolt-fastening portion
50 Positive electrode external connection busbar (second external connection busbar)
50B The other end of positive electrode external connection busbar
60 Electricity storage element group
61 Electricity storage element
63 Electrode terminal
63A Positive electrode terminal
63B Negative electrode terminal
70 Busbar holding module
71, 71A, 71B Insulating protector
91, 92 External device connection busbar (external connection component)
OUTN Negative electrode output terminal (first output electrode terminal)
OUTP Positive electrode output terminal (second output electrode terminal)
K2 Predetermined clearance

The invention claimed is:

1. An external connection busbar holding module configured to be attached to an electricity storage element group including a plurality of electricity storage elements each including positive and negative electrode terminals,
the electricity storage element group including a first output electrode terminal that outputs power of one polarity, and a second output electrode terminal that outputs power of another polarity,
the external connection busbar holding module comprising:
a first external connection busbar having one end configured to be connected to the first output electrode terminal, the first external connection busbar including, at another end thereof, a bolt-fastening portion that is bent orthogonal to the one end, and to which an external connection component is to be bolted; and
an external connection busbar protector that holds the first external connection busbar,
wherein the external connection busbar protector includes a positioning portion into which the bolt-fastening portion is inserted, and that positions the first external connection busbar, and
the positioning portion includes an entrance portion having a predetermined clearance relative to the bolt-fastening portion, and a clearance reduction portion that reduces the predetermined clearance.

2. The external connection busbar holding module according to claim 1,
wherein the external connection busbar protector includes the positioning portions at positions corresponding to opposite end portions of the bolt-fastening portion in a width direction, and
the clearance reduction portion clamps an end portion of the bolt-fastening portion.

3. The external connection busbar holding module according to claim 2,
wherein the external connection busbar protector includes fixing pawls that fix the first external connection busbar in locations close to the respective corresponding positioning portions, and
the first external connection busbar has openings in which the fixing pawls are respectively locked to bent portions extending continuously with the bolt-fastening portion.

4. The external connection busbar holding module according to claim 1,
wherein the external connection busbar protector includes a nut accommodating portion that accommodates a nut to be bolt-fastened, and that has a fastening clearance serving as a clearance relative to the nut before being bolt-fastened, and
the clearance reduction portion has a clearance smaller than the fastening clearance.

5. The external connection busbar holding module according to claim 1,
wherein a connection portion between the one end of the first external connection busbar and the first output electrode terminal is a welded connection portion.

6. The external connection busbar holding module according to claim 1, comprising:
a second external connection busbar that is held by the external connection busbar protector, the second external connection busbar having one end configured to be connected to the second output electrode terminal, and another end that includes a bolt-fastening portion,
wherein the external connection busbar protector holds the second external connection busbar, and includes a positioning portion corresponding to a bolt-fastening portion of the second external connection busbar.

7. The external connection busbar holding module according to claim 1,
wherein the first external connection busbar has a length extending from the electricity storage element at one end of the electricity storage element group to the electricity storage element at another end thereof.

8. A connection module configured to be attached to an electricity storage element group including a plurality of electricity storage elements each including positive and negative electrode terminals, the connection module comprising:
the external connection busbar holding module according to claim 1; and
a busbar holding module including a plurality of busbars that connect the positive electrode terminal and the negative electrode terminal of adjacent electricity storage elements to each other, and an insulating protector that holds the plurality of busbars.

* * * * *